United States Patent
Marshall et al.

(10) Patent No.: US 6,510,608 B1
(45) Date of Patent: Jan. 28, 2003

(54) HABITABLE VEHICLE UTILITY DOCKING APPARATUS AND METHOD

(75) Inventors: George J. Marshall, 6 Sage Ct., Clifton Park, NY (US) 12065-2008; Emery M. Otruba, Hoosick Falls, NY (US)

(73) Assignee: George J. Marshall, Clifton Park, NY (US)

( * ) Notice: Subject to any disclaimer, the term of this patent is extended or adjusted under 35 U.S.C. 154(b) by 136 days.

(21) Appl. No.: 09/649,430

(22) Filed: Aug. 25, 2000

(51) Int. Cl.[7] .............................................. H01R 43/00
(52) U.S. Cl. ...................... 29/869; 29/890.1; 29/889.1; 29/890.14; 29/401.1
(58) Field of Search ............................ 29/869, 868, 870, 29/831, 401.1, 446, 450, 469, 890.1, 890.144, 890.14, 889.1; 174/38, 45 R, 51, 60; 285/311

(56) References Cited

U.S. PATENT DOCUMENTS

| | | | |
|---|---|---|---|
| 2,379,226 A | * 6/1945 | Frey | .................. 174/152 R |
| 3,602,869 A | * 8/1971 | Metz et al. | ............... 439/191 |
| 3,614,538 A | * 10/1971 | Nickola | ........................ 174/38 |
| 3,753,049 A | 8/1973 | Plummer | |
| 3,857,044 A | 12/1974 | Papoi et al. | |
| 4,032,821 A | 6/1977 | Keiser | |
| 4,088,381 A | 5/1978 | Harnett | |
| 4,133,021 A | 1/1979 | King et al. | |
| 4,231,595 A | 11/1980 | Knutsen | |
| 4,307,436 A | 12/1981 | Eckart et al. | |
| 4,352,532 A | 10/1982 | Hardin | |
| 4,394,706 A | 7/1983 | Crafts | |
| RE31,359 E | 8/1983 | Nickola | |
| 4,519,657 A | * 5/1985 | Jensen | ........................ 174/38 |
| 4,559,410 A | 12/1985 | Hostetter | |
| 4,642,418 A | 2/1987 | Menchetti | |
| 4,652,064 A | 3/1987 | Cetrone | |
| 4,758,027 A | 7/1988 | Todd | |
| 4,778,399 A | 10/1988 | Schenk | |
| 4,785,376 A | 11/1988 | Dively | |
| 4,840,574 A | 6/1989 | Mills | |
| 4,854,349 A | 8/1989 | Foreman | |
| 4,873,600 A | 10/1989 | Vogele | |
| 4,887,187 A | * 12/1989 | Nickola | ........................ 174/51 |
| 5,030,128 A | 7/1991 | Herron et al. | |
| 5,134,541 A | 7/1992 | Frouin | |
| 5,323,813 A | 6/1994 | Barrett | |
| 5,330,233 A | 7/1994 | Kress | |
| 5,349,146 A | * 9/1994 | Radabaugh | .................. 15/314 |
| 5,354,204 A | 10/1994 | Hughes | |
| 5,390,691 A | 2/1995 | Sproule | |
| 5,417,460 A | 5/1995 | Lunder | |
| 5,431,455 A | 7/1995 | Seely | |
| 5,560,390 A | 10/1996 | Royds | |
| 5,622,392 A | 4/1997 | Gochenouer | |
| 5,623,542 A | 4/1997 | Schneider et al. | |
| 5,658,031 A | 8/1997 | DiBiagio et al. | |
| 5,658,159 A | 8/1997 | Gardner et al. | |
| 5,667,256 A | 9/1997 | Caine | |
| 5,709,414 A | 1/1998 | Bailey et al. | |
| 5,711,245 A | 1/1998 | Knirck | |
| 5,733,141 A | 3/1998 | Penrod | |

* cited by examiner

*Primary Examiner*—Peter Vo
*Assistant Examiner*—Tim Phan
(74) *Attorney, Agent, or Firm*—Jay R. Yablon (57) ABSTRACT

A habitable vehicle utility docking apparatus comprises a fixed-half quick connect panel fixed to a habitable vehicle such as a recreational vehicle or a boat, and a removable-half quick connect panel matable therewith. The fixed-half quick connect panel maintains a permanent connection to utilities inside the habitable vehicle. The removable-half quick connect panel is connected via commonly-used hoses and wires to external docking station utility services at a campsite, marina, etc. docking station. This avoids the time and inconvenience of having to make a multiplicity of utility connections and disconnections for each and every coming and going of the habitable vehicle to and from the docking station.

28 Claims, 5 Drawing Sheets

HABITABLE VEHICLE UTILITY DOCKING APPARATUS AND METHOD

FIELD OF THE INVENTION

This invention relates generally to the field of utility and similar interconnections, and in particular, to providing ways of simplifying the connection and disconnection of habitable vehicles such as recreational vehicles and houseboats to docking station utility services.

BACKGROUND OF THE INVENTION

Recreational vehicles, boats, and similar habitable vehicles are widely used throughout the United States and elsewhere. These vehicles enable their users to travel to distant, varied locations, while having available to them many of the comforts of home. These comforts include, but are not limited to, such utility services as hot and cold running potable water, sewage lines for the disposal of non-potable water and waste, electric power, telephone service, cable television, high-speed computer data lines, and a cleaning vacuum. Each of these utility services, of course, needs to be established by interconnecting external service lines with the internal wiring, plumbing, etc. of the habitable vehicle.

It is often the case that the users of a habitable vehicle will wish to set up camp at a given camp site docking station for an extended period of time, but will from time to time leave that location, in their habitable vehicle, to travel for a more limited period of time to another nearby temporary location such as a beach, restaurant, shopping center, etc. Each time the vehicle leaves and later returns to the docking station, it is necessary for the users to disconnect and later reconnect each and every one of these utility service connections. This is a very cumbersome and time-consuming process.

While this problem might be envisioned in terms of a recreational vehicle at a camp site, it is also a problem that applies, for example, to a boat which is docked at a marina overnight, then leaves for the day, and returns for the next night. More generally, this is a problem for any sort of habitable vehicle for which it is necessary to establish a multiplicity of utility connections at a single base location, and to repeatedly disconnect and reconnect these utility connections each and every time the vehicle leaves and returns to this base location.

The prior art discloses numerous varieties of fluidic and electrical connectors, as well as devices incorporating two or more such connectors in parallel. For example, U.S. Pat. No. 3,602,869 discloses a pair of plate members enabling "a plurality of hydraulic and/or electrical couplings connected or disconnected by joining or separating the panel members." (abstract) The coupling panel according to this disclosure is used "for simultaneously connecting and disconnecting a plurality of fluid and/or electrical conduits, for example, between the engine and cab of a truck." (column 1, lines 6–8).

U.S. Pat. No. 3,602,869, however, does not in any way identify the constant disconnection and reconnection of multiple utility couplings for habitable vehicles as a specific problem requiring resolution, nor is it even remotely suggestive that this is a problem. Further, this disclosure does not teach or suggest its combination with any type of structural components that would enable this invention to be connected with a habitable vehicle and used to alleviate this constant disconnection and the reconnection of multiple utility couplings, since this reference is individually complete by itself and such structural components are not at all necessary. Further, this disclosure does not teach or suggest any form of structure for protecting the various panel couplings from the adverse weather, since this panel, in use, would not be exposed to the elements in the same way as panels used to establish multiple utility connections to a habitable vehicle. Further, this disclosure does not in any way teach or suggest any use of or application to the types of utility conduits that would be necessary to enable human habitation of a habitable vehicle, since these types of conduits are irrelevant to what is needed to connect a truck engine and cab. Finally, this disclosure does not provide any way of maintaining the integrity of electrical, telephone and similar "signal" connectors separately from that of potable water connectors, and of these two types of connector separately from sewage connectors, so that, for example, a sewage leak does not contaminate the potable water, or a potable water leak does not short the electrical connection. In this way too, U.S. Pat. No. 3,602,869 is individually complete by itself, and since this reference does not at all deal with utility connections of the type needed to supply, e.g., power, water, and sewage discharge for a habitable vehicle, the need to maintain these connections with separate integrity from one another would be unnecessary and irrelevant as regards U.S. Pat. No. 3,602,869.

In short, problem faced by habitable vehicle owners of constantly disconnecting and reconnecting multiple utility couplings is completely unrecognized by U.S. Pat. No. 3,602,869. This reference is individually complete and functional in and of itself, so there would be no reason to add any components enabling the panel of this reference to be used for the disconnection and reconnection of multiple utility couplings for habitable vehicles.

U.S. Pat. Nos. 3,614,538; 4,133,021; 4,519,657; 4,785,376; 4,873,600 and U.S. Pat. No. Re. 31,359 all disclose various mounting pedestals for utilities, and are examples of types of fixed docking stations used to provide multiple utility services to habitable vehicles stationed at a camp site, marina, etc. But these references do not disclose or suggest any way to easily and repeatedly disconnect and reconnect a habitable vehicle with the utility services provided by these mounting pedestals. Nor do they even identify the need to repeatedly disconnect and reconnect a habitable vehicle to these docking station utility services as a problem. Nor do they in any way disclose or suggest a combination with the teachings of, for example, U.S. Pat. No. 3,602,869 in order to resolve this unidentified problem. Finally, because U.S. Pat. Nos. 3,614,538; 4,519,657; 4,785,376; 4,873,600; and U.S. Pat. No. Re. 31,359 all deal particularly with the issue of delivering multiple utility services to a camp site, marina, etc., the inventors thereof would certainly have had ample opportunity to identify the repeated disconnection and interconnection of habitable vehicles to these utility services as a problem, and would have had ample opportunity to make suggestions regarding the resolution of this problem. Yet they did not do so.

Another example of a composite multi connector is disclosed, for example, in U.S. Pat. No. 4,652,064. This reference also, does not in any way disclose or suggest that the repeated disconnection and reconnection of habitable vehicles with docking station utility services is a problem. Nor does it disclose or suggest any way of solving this problem. Nor would it be necessary this reference to do so, since it is fully complete in and of itself.

U.S. Pat. No. 4,778,399 discloses an outlet module "for making connection to various electrical systems such as power, telephone, computer systems, television antenna etc." (abstract) This patent, however, also does not disclose or suggest how to establish and terminate all of these interconnections, simultaneously and repeatedly, in a simple manner. Nor does it in any way disclose or suggest that the repeated disconnection and reconnection of habitable vehicles with such utility services is a problem. Nor does it disclose or suggest any combination with a reference such as U.S. Pat. No. 3,602,869 in order to resolve this unidentified problem. Further, because of the configuration of this outlet module, it would in fact be impossible or extremely difficult to achieve such a simplification of disconnection and reconnection.

U.S. Pat. No. 5,030,128 discloses a docking module used to facilitate "conversion of a portable computer between a lap-top mode of operation and a desk-top mode of operation by permitting simultaneous attachment of the computer to a plurality of electrical connectors thereby ease eliminating the need for individual cable connections between the computer and the respective individual apparatus." (abstract) This reference, however, is non-analogous prior art, since it is from a very different technical field. Further, it does not in any way disclose or suggest that the repeated disconnection and reconnection of habitable vehicles with docking station utility services is a problem. Nor does it disclose or suggest any application of its teachings to this unidentified problem of habitable vehicle utility connection.

OBJECTS OF THE INVENTION

It would be desirable, therefore, for the user of a habitable vehicle to be able to disconnect the multiple docking station utility services provided to this vehicle all at once when the vehicle is ready to temporarily leave its docking station at, e.g., a camp site, marina, etc., and to reconnect these docking station utility services all at once when the vehicle returns to the docking station, without having to reestablish each and every utility connection individually. While the connection and disconnection of each distinct utility service is still necessary at the beginning and at the end of a vacation or similar excursion based primarily at the docking station, it would certainly be desirable to avoid having to make this multiplicity of utility connections and disconnections for each and every coming and going of the habitable vehicle to and from the docking station throughout the entire vacation or similar excursion.

It is also desirable to protect any connectors used for this purpose from damaging exposure to weather.

It would also be desirable to maintain any connectors used for this purpose in a manner that maintains their integrity, and in particular, ensures that a leak from or damage to any one connector does not damage any of the other connectors or their connections.

SUMMARY OF THE INVENTION

A habitable vehicle utility docking apparatus comprises a fixed-half quick connect panel fixed to a habitable vehicle such as a recreational vehicle or a boat, and a removable-half quick connect panel matable therewith. The fixed-half quick connect panel maintains a permanent pre-connection to utilities inside the habitable vehicle. The removable-half quick connect panel is connected via commonly-used hoses and wires to external docking station utility services at a campsite, marina, etc. docking station. When the removable-half quick connect panel is so-connected to such external docking station utility services, and when it is also mated to fixed-half quick connect panel, these docking station utility services are supplied to the habitable vehicle. The preferred method of use is to disconnect removable-half quick connect panel from fixed-half quick connect panel while leaving all the external utility connections intact when the habitable vehicle is about to leave the docking station temporarily, and to later reattach these panels together thereby reestablishing all the utility connections to the habitable vehicle when the vehicle does return. This avoids the time and inconvenience of having to make a multiplicity of utility connections and disconnections for each and every coming and going of the habitable vehicle to and from the docking station.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
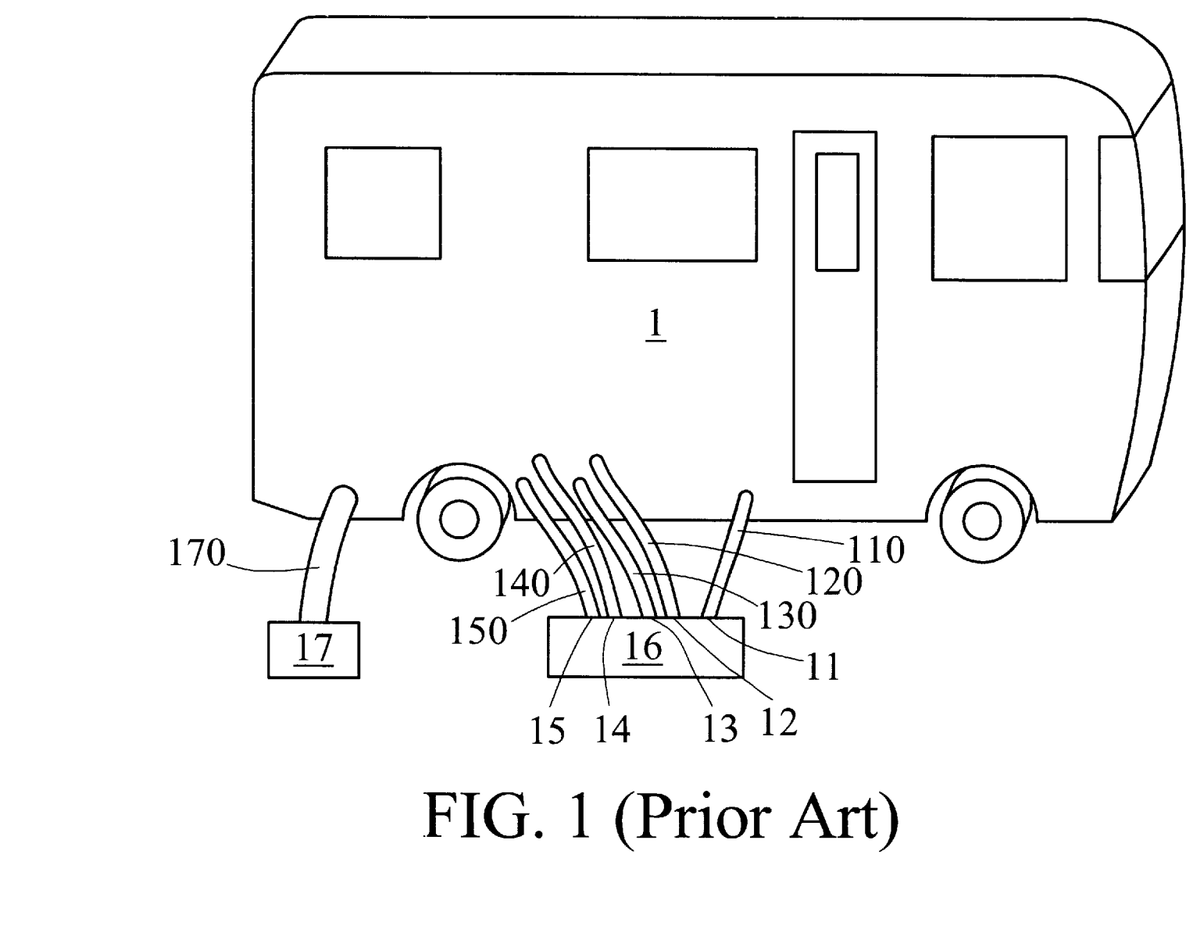
FIG. 1 is a schematic illustration of the prior art, showing a habitable vehicle such as a recreational vehicle connected to a plurality of docking station utility services in such a manner that requires the disconnection and reconnection of each and every such service, each and every time the vehicle leaves and returns to its docking station.

FIG. 1 illustrates the manner in which a habitable vehicle 1 such as a recreational vehicle is typically connected to docking station utility services according to the prior art. Generally these services may include, but are not limited to, potable water 11, electrical power 12, cable television 13, telephone 14, and these days, high-speed computer data 15. Frequently, the aforementioned incoming services are all delivered from a utility pedestal 16 such as is disclosed by aforementioned U.S. Pat. Nos. 3,614,538; 4,519,657; 4,785,376; 4,873,600; and U.S. Pat. No. Re. 31,359. Additionally, these docking station utility services also include outgoing sanitary sewage service 17. For sanitary reasons, the location of sewage service 17 is typically removed by a suitable distance from the location of utility pedestal 16 which delivers the aforementioned incoming utility services. Not specifically illustrated, but also desirable, are such services as a cleaning vacuum.

Each of these docking station utility services is delivered to habitable vehicle 1 via a series of external utility conduits each of which must be disconnected each time habitable vehicle 1 leaves the docking station and reconnected each time the vehicle returns. These external utility conduits include, but are not limited to, potable water line 110, electric power line 120, cable television line 130, telephone line 140, computer data line 150, and sewage line 170.

As noted in the discussion earlier, the need to disconnect and reconnect each of these individual external utility conduits each time habitable vehicle 1 leaves and returns to the docking station is quite time-consuming and undesirable.

Figure 2:
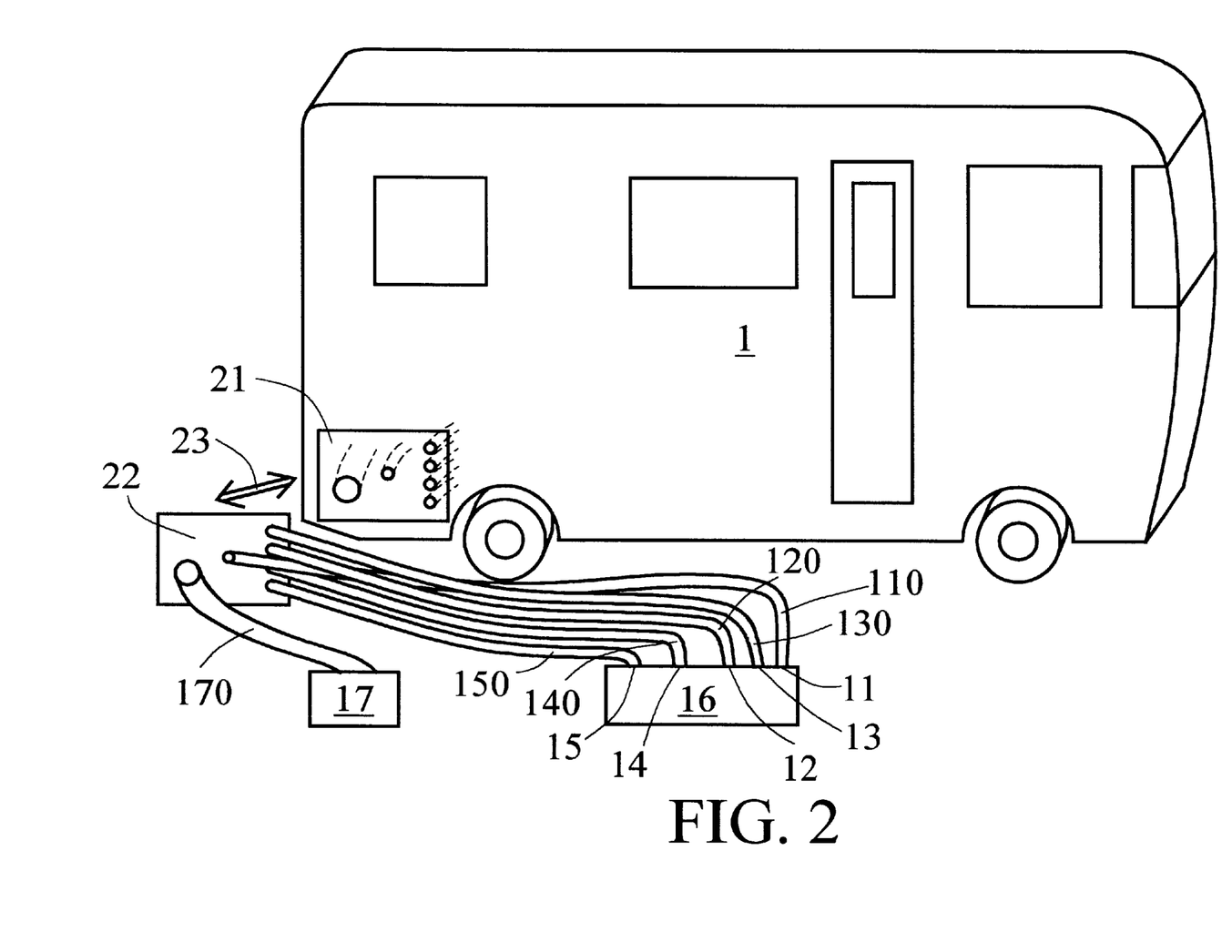
FIG. 2 is a schematic illustration of a preferred embodiment of the invention, depicting a habitable vehicle utility docking system comprising a fixed-half quick connect panel connecting to utility conduits within the habitable vehicle, and a removable-half quick connect panel connecting to the docking station utility services at the docking station, as well as the method by which these services are quickly and easily disconnected and reconnected whenever the vehicle leaves and returns to the docking station.

FIG. 2 illustrates a quick connect panel system according to a preferred embodiment of the invention, comprising a fixed-half quick connect panel 21 and a removable-half quick connect panel 22.

Fixed-half quick connect panel 21 is permanently pre-attached to habitable vehicle 1 in a location and manner readily accessible from outside said habitable vehicle 1 (such as proximate the outer surface of habitable vehicle 1), and leads via utility conduits internal to habitable vehicle 1 to various locations within habitable vehicle 1 where these utility services are actually used. These internal conduits are illustrated using unnumbered, truncated, hidden line elements emanating from fixed-half quick connect panel 21 into habitable vehicle 1. This permanent pre-attachment of fixed-half quick connect panel 21 to habitable vehicle 1 is achieved either by retrofitting fixed-half quick connect panel 21 to a preexisting habitable vehicle 1, or alternatively, by manufacturing habitable vehicle 1 so as to already have fixed-half quick connect panel 21 integral therewith at the outset.

To retrofit fixed-half quick connect panel 21 to preexisting habitable vehicle 1, fixed-half quick connect panel 21 may be mounted below habitable vehicle 1 or installed in a compartment. Or, it mat be necessary or desirable to remove a portion of the outer body of habitable vehicle 1 and mount fixed-half quick connect panel 21 substantially flush with the outer surface of habitable vehicle 1. In any event, it is necessary to run all of these internal conduits to reach the location where fixed-half quick connect panel 21 is to be attached, permanently pre-connect these internal conduits to the inside, non-mating surface (surface facing into the vehicle) of fixed-half quick connect panel 21, and finally, permanently pre-attach fixed-half quick connect panel 21 to habitable vehicle 1. This attachment of fixed-half quick connect panel 21 into combination with habitable vehicle 1 may be achieved through a variety of panel-to-vehicle attachment means, including, but not limited to, screwing, bolting, gluing, and/or welding.

An outer, non-mating surface of removable-half quick connect panel 22 (the surface which faces outward from habitable vehicle 1) is directly connected to, for example not limitation, potable water 11, electrical power 12, cable television 13, telephone 14, high-speed computer data 15, and sanitary sewage 17 services, via the aforementioned external utility conduits, namely, potable water line 110, electric power line 120, cable television line 130, telephone line 140, computer data line 150, and sewage line 170, respectively. A cleaning vacuum exemplifies another service which may also be desired and have its own connection, however, to avoid drawing clutter, is not specifically illustrated here. The enumeration of specific utility-type services and corresponding interconnections in this disclosure and its associated claims is not limiting, which is to say that it would be an obvious extension of this disclosure and would fall within the scope of the associated claims to include other, non-enumerated utility-type services as well according to the apparatus and method disclosed herein. Also, it should be clear that a subset of the aforementioned utility services might also be provided, and some of these services omitted, also still within the scope of this disclosure and its associated claims.

The aforementioned connection of removable-half quick connect panel 22 to these various external utility conduits is established one time only, when habitable vehicle 1 first arrives at the docking location to begin a vacation or similar extended stay. Similarly, removable-half quick connect panel 22 is disconnected from these various external utility conduits one time only, when habitable vehicle 1 is about to depart the docking station at the end of the vacation or similar extended stay.

Fixed-half connect panel 21 and removable-half quick connect panel 22 are then designed to mate directly with one another, in such a manner that all of the external utility conduits connected to removable-half quick connect panel 22 will further connect directly to the corresponding internal conduits within habitable vehicle 1 as a result of this mating.

A latching system discussed further in connection with FIGS. 3 and 4 is a non-limiting example of one way to secure a tight-fitting mated connection between fixed-half quick connect panel 21 and removable-half quick connect panel 22, and between the two halves (external and internal) of the respective utility conduits attached to these panels. One or more weather tight covers discussed in connection with FIGS. 5 are used to protect these panels and their utility conduit interconnections from the elements in various situations.

A preferred method of using this quick connect panel system is as follows: When habitable vehicle 1 first arrives at the docking station, removable-half quick connect panel 22 will typically already be connected (fully mated) and latched (secured) to fixed-half quick connect panel 21. All of the external utility conduits such as potable water line 110, electric power line 120, cable television line 130, telephone line 140, computer data line 150, sewage line 170, and, e.g., not illustrated cleaning vacuum need therefore simply be connected to removable-half quick connect panel 22, in the customary manner. Once this has occurred, and the connections at the docking station are turned on, all of the utility connections become fully activated. It is to be noted that the connection of these various external utility conduits to removable-half quick connect panel 22 is achieved using precisely the same connector interfaces as would be used to connect these various external utility conduits to an ordinary habitable vehicle which does not employ this invention, such as is illustrated in FIG. 1. Of course, the order of the aforementioned mating and connection steps does not matter: removable-half quick connect panel 22 may already be connected (fully mated) and latched to fixed-half quick connect panel 21 before the external utility conduits are connected to removable-half quick connect panel 22, or the external utility conduits may be connected to removable-half quick connect panel 22 before removable-half quick connect panel 22 is mated and latched to fixed-half quick connect panel 21.

Before habitable vehicle 1 leaves the docking station temporarily, and is to return in the near future, removable-half quick connect panel 22 is simply unlatched and disconnected (unsecured and unmated) from fixed-half quick connect panel 21. This disconnection (and subsequent reconnection to be discussed) is illustrated by double arrow 23. All of the connections of the external utility conduits to removable half quick connect panel 22, however, are maintained as is, without detachment. While habitable vehicle 1 is temporarily gone from the docking station, removable half quick connect panel 22 remains at the docking station with all of its utility connections intact.

After habitable vehicle 1 returns to the docking station, removable-half quick connect panel 22 is simply reconnected and relatched (re-mated and re-secured) to fixed-half quick connect panel 21, and all of the utility connections are then immediately in place for reactivation. This method of unlatching and disconnecting removable half quick connect panel 22 from fixed-half quick connect panel 21 when the vehicle is about to leave the docking station, and then reconnecting and relatching removable half quick connect panel 22 to fixed-half quick connect panel 21 when the vehicle returns to the docking station, is iteratively repeated over and over, as often as necessary, throughout the entire vacation or similar extended stay.

Finally, when it is time for habitable vehicle 1 to leave the docking station for the final time, such as at the end of the vacation or similar extended stay, the external utility lines are all disconnected from removable half quick connect panel 22, and then the vehicle leaves the docking station with both halves of the quick connect panel system.

It is to be noted again that the connection of the various utility lines to removable-half quick connect panel 22 is achieved using precisely the same connector interfaces as would be used to connect these various utility lines to an ordinary habitable vehicle which does not employ this invention, such as in FIG. 1. Typically, many of these interfaces require more than simply "plugging in" the utility lines to the connector interface. Often, for at least some of the interfaces such as water and sewage, some form of screwing and/or clamping is required, which adds to the time and complexity of making these connections and disconnections.

Because the mating of removable half quick connect panel 22 with fixed-half quick connect panel 21 is achieved by the simple operation of merely pressing and then latching these two panels together, not only is the number of interconnections being made reduced from several (in these illustrations, six) to one, but the complexity of making these connections is significantly reduced, insofar as connection operations such as screwing or clamping are eliminated, and replaced by the single operation of mating and securing removable half quick connect panel 22 with fixed-half quick connect panel 21. The same considerations apply to disconnection (un-securing and un-mating) as well.

Figure 3A:
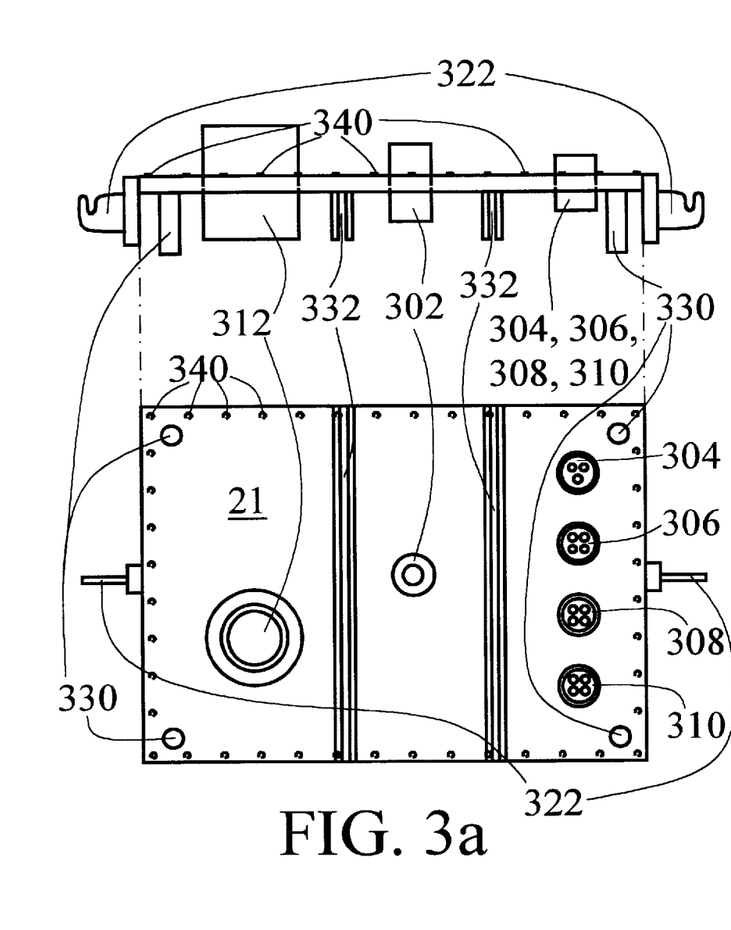
FIGS. 3a and 3b illustrate front and top detailed plan views of, respectively, the fixed-half and removable-half quick connect panels in a preferred embodiment of the invention.
Figure 3B:
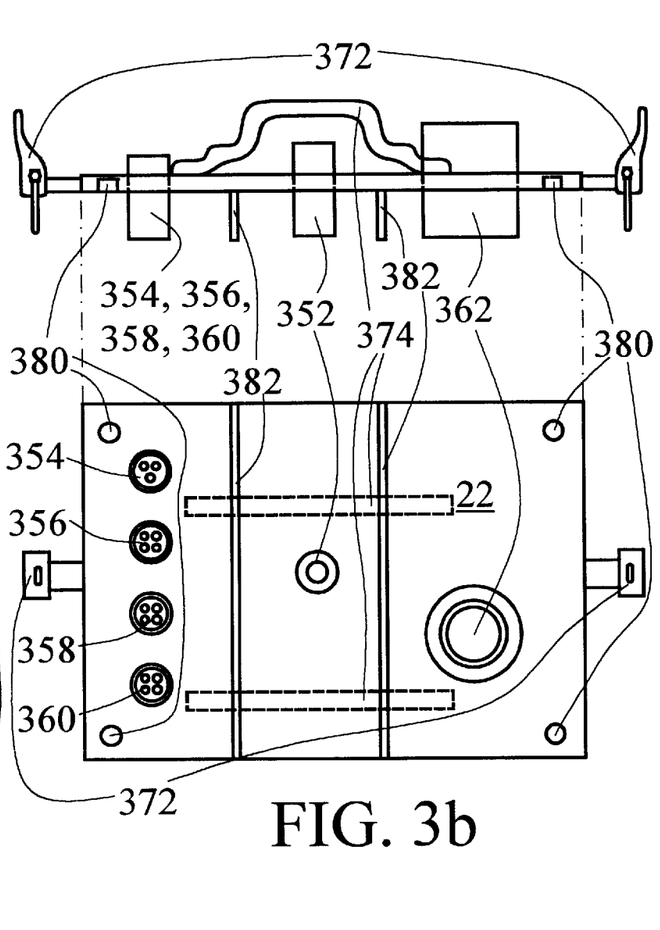

FIGS. 3a and 3b illustrate these panels in further detail. FIG. 3a illustrates fixed-half quick connect panel 21 comprising "first half" connectors for each of potable water 302, cable television 304, electrical power 306, telephone 308, computer data 310, and sewage 312. FIG. 3b illustrates removable-half quick connect panel 22 comprising "second half" connectors for each of potable water 352, cable television 354, electrical power 356, telephone 358, computer data 360, and sewage 362. Each one of the "first half" connectors can be either male or female connectors; the "second half" connector corresponding to a given "first half" connector will of course be of opposite gender. These connector halves can be any suitable "press-together" connectors presently known or which may in the future become known in the art. The side plan views of FIGS. 3a and 3b show the "mating" surface of each of the fixed-half 21 and removable-half 22 quick connect panels (the surfaces which are pressed together), and obscure the "non-mating" surfaces thereof. The top views project along the "dash-dot" projection lines of these FIGS.

Potable water connectors 302 and 352, for example not limitation, may comprise a domestic water quick connect, Hubbell model 1269 brass water connector. Other acceptable manufacturers for potable water connectors 302 and 352 include, for example not limitation, Nibco and Nelson. Cable television connectors 304, 354 may comprise, for example not limitation, quick connect Hubbell model HBL320R4W and HBL320P4W connector halves. Other acceptable manufacturers for cable television connectors 304, 354 include, for example not limitation, Crose Hinds and Arrow Hart. Electrical power connectors 306, 356 may comprise, for example not limitation, Hubbell model HBL430R12W and HBL430P12W connector halves. Other acceptable manufacturers for electrical power connectors 306, 356 include, for example not limitation, Crose Hinds and Arrow Hart. Telephone connectors 308, 358 may comprise, for example not limitation, Hubbell model HBL420R12W and HBL420P12W connector halves. Other acceptable manufacturers for telephone connectors 308, 358 include, for example not limitation, Crose Hinds and Arrow Hart. Suitable computer data connectors 310, 360 are also provided, for example not limitation, by Crose Hinds and Arrow Hart. Finally, sewage connectors 312, 362 may comprise, for example not limitation, a sanitary quick connect Prest-O-Fit model 15934 universal sewer hose female adapter mating with a 3 inch PVC male pipe connection. Other acceptable manufacturers for sewage connectors 312, 362 include, for example not limitation, Camco, Thetford, Valterra, and E-Z Coupler.

Also illustrated in FIGS. 3 are securing means such as an illustrated pair of latch plates 322 and corresponding latch clamps 372 mating and latching therewith. These may comprise, for example not limitation, Carr Lane latch system model 5E651, or any similar suitable securing means known in the art. Also illustrated are a pair of hand grips 374 such as the illustrated gripping handles, as well as alignment guides such as the illustrated four male guide rods 330 and female guide rod receptacles 380 mating therewith used to establish a proper mating alignment. Variations in these latching (securing), gripping and alignment guide elements would be well known in the art and are considered to be within the scope of this disclosure and its associated claims.

Also illustrated are elongated female slots 332 and elongated male ridges 382 mating therewith, which separate the electrical and telephone connectors 304, 306, 308, 310, and 354, 356, 358, 360 from the potable water connectors 302 and 352, and all of the aforementioned connectors from the sewage connectors 312 and 362. These elongated female slots 332 and elongated male ridges 382 thereby define three distinct, segregated connector regions of removable half quick connect panel 22 and fixed-half quick connect panel 21.

Finally, FIG. 3a illustrates panel-to-vehicle preattachment means 340 about the perimeter of fixed-half quick connect panel 21, such as but not limited to, screws, bolts, glue, and/or welds which are used to attach fixed-half quick connect panel 21 to habitable vehicle 1, particularly when the utility docking apparatus disclosed herein is retrofitted to habitable vehicle 1. Panel-to-vehicle attachment means 340 are illustrated in this Figure, for example only, as a plurality of weld spots. Of course, as noted earlier, habitable vehicle 1 can also be manufactured so as to already comprise fixed-half quick connect panel 21 integral therewith at the outset. It is understood that male and female connectors can easily be reversed with respect to what is illustrated in the drawings within the scope of this disclosure and its associated claims.

Figure 4A:
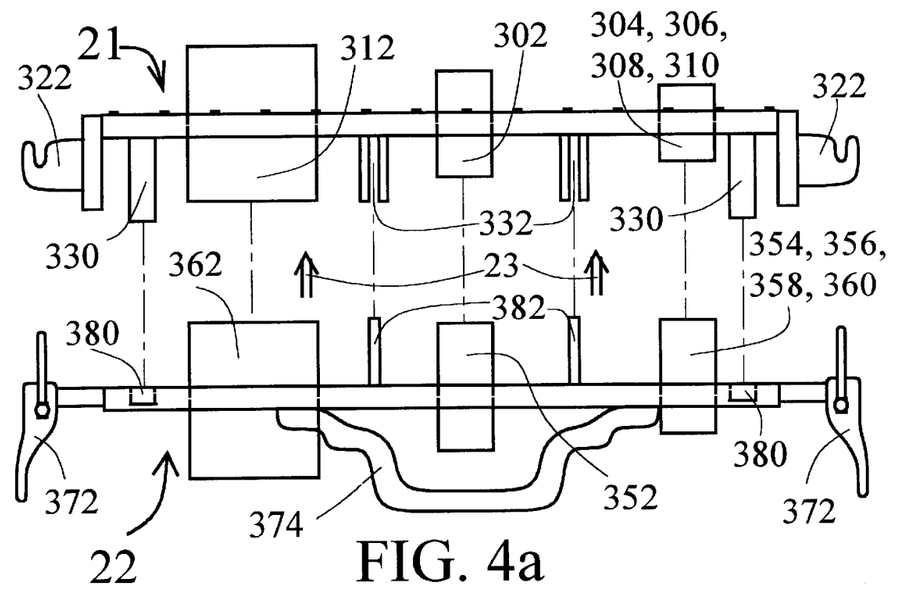
FIG. 4 illustrate top plan views of the mating between the fixed-half and removable-half quick connect panels of FIG. 3, as well as the connection of the fixed-half quick connect panel to internal utility conduits within the habitable vehicle and of the removable-half quick connect panel to external utility conduits receiving docking station utility services from outside of the habitable vehicle.

Referring now to FIG. 4*a*, panel gripping handles 374 are used as a gripping means to move removable-half quick connect panel 22 into proper mating position relative to fixed-half quick connect panel 21. These two panels are oriented and aligned so that their mating surfaces face one another and each connector first half lines up with its corresponding connector second half. Aligning guides such as male guide rods 330 and female guide rod receptacles 380 are similarly aligned with each other, as are elongated female slots 332 and elongated male ridges 382. All of these alignments are highlighted by the centerlines drawn between the various mating elements of fixed-half quick connect panel 21 and removable-half quick connect panel 22. Removable-half quick connect panel 22 is then moved together as illustrated by double arrow 23 and pressed firmly against fixed-half quick connect panel 21 until each connector first half lines mates with its corresponding connector second half. Finally, latch clamps 372 and latch plates 322 are mated and latched together so as to secure both panels and all connectors firmly together.

Figure 4B:
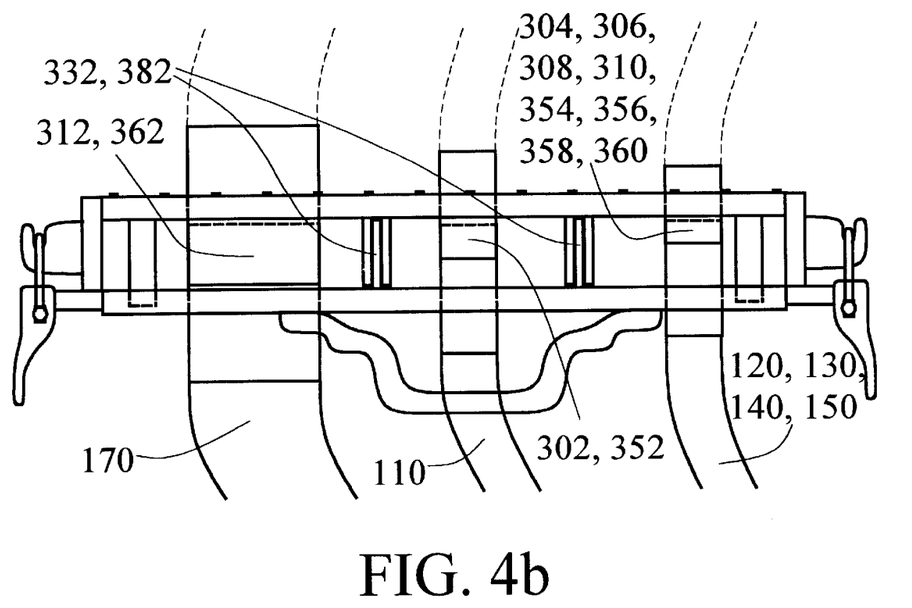

FIG. 4*b* illustrates fixed-half quick connect panel 21 and removable-half quick connect panel 22 once these have been somated and latched together. This FIG. also illustrates the external utility conduits, namely, potable water line 110, electric power line 120, cable television line 130, telephone line 140, computer data line 150, and sewage line 170 earlier shown and discussed in FIGS. 1 and 2, as well as, in broken lines, the unnumbered internal conduits within habitable vehicle 1 which are permanently pre-connected to the non-mating inner surface of fixed-half quick connect panel 21 that were earlier shown and discussed in FIG. 2. As such, this FIG. illustrates not only the interconnection of fixed-half quick connect panel 21 with removable-half quick connect panel 22, but the full interconnection of all the docking station utility services to and with habitable vehicle 1. Note that in this drawing, the connector halves attached to removable-half quick connect panel 22 are shown to be inside of those attached to fixed-half quick connect panel 21 by virtue of the broken (hidden) lines as drawn, and are thus male connectors. Again, however, any set of male/female orientations as between these two panels and their respective connectors, alignment guide rods 330 and receptacles 380, elongated slots 332, and ridges 382, etc., is considered to be within the scope of this disclosure and its associated claims. The unlatching (un-securing) and disconnection (un-mating) of fixed-half quick connect panel 21 from removable-half quick connect panel 22 simply follows the inverse of the steps described above for mating these two panels.

Referring also to the side views of FIGS. 3*a* and 3*b*, it is important to observe that once fixed-half quick connect panel 21 and removable-half quick connect panel 22 have been mated and secured together as shown in FIG. 4*b*, elongated female slots 332 and elongated male ridges 382 mate together in such as way as to form a fluid-impenetrable and debris-impenetrable barrier partition between the sewage connectors 312, 362 and the potable water connectors 302, 352, as well as between these aforementioned connectors and the signal connectors 304, 306, 308, 310, 354, 356, 358, 360 which carry the cable television, electrical power, telephone, and computer data signals. By maintaining such a barrier between the sewage connectors and the potable water connectors, any leakage that might occur in the sewage connectors will be blocked from affecting the potable water supply, thus avoiding any potential contamination. Similarly, by segregating the signal connectors from the potable water and sewage connectors, any leakage from the potable water or sewage connectors will not contact the electrical circuit or similar and cause a short circuit or similar disruption. Nor would such a leak cause any type of damage to the remaining signal connectors. It may also be desirable to similar segregate any cleaning vacuum utility service as well, to the contamination of other conduits by vacuum debris.

Figure 5A:
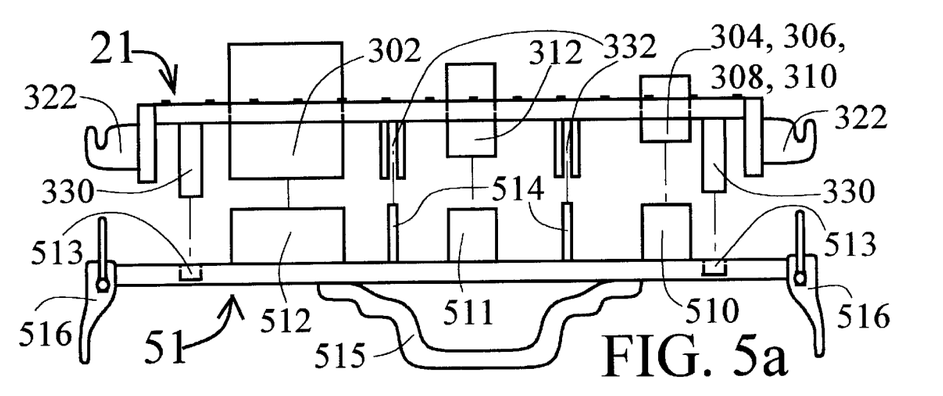
FIGS. 5a–5c illustrate top plan views of preferred embodiments for several weather tight coverings use to protect the panels and various utility connectors of FIGS. 3 and 4.
Figure 5B:
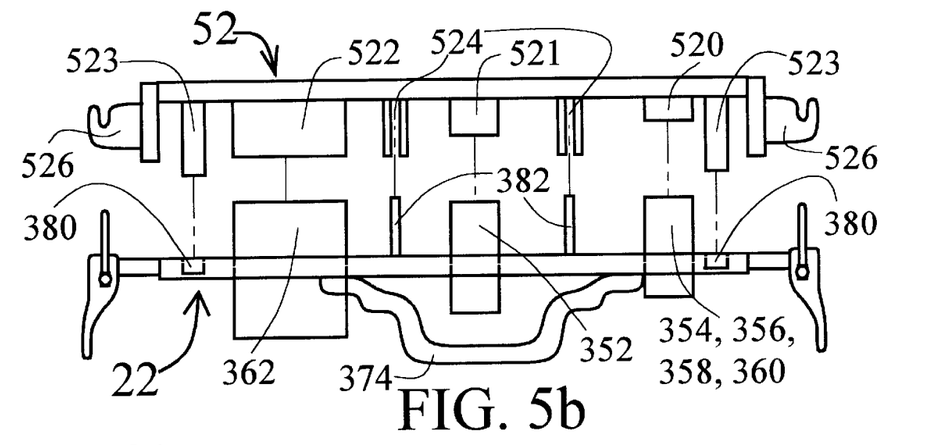
Figure 5C:
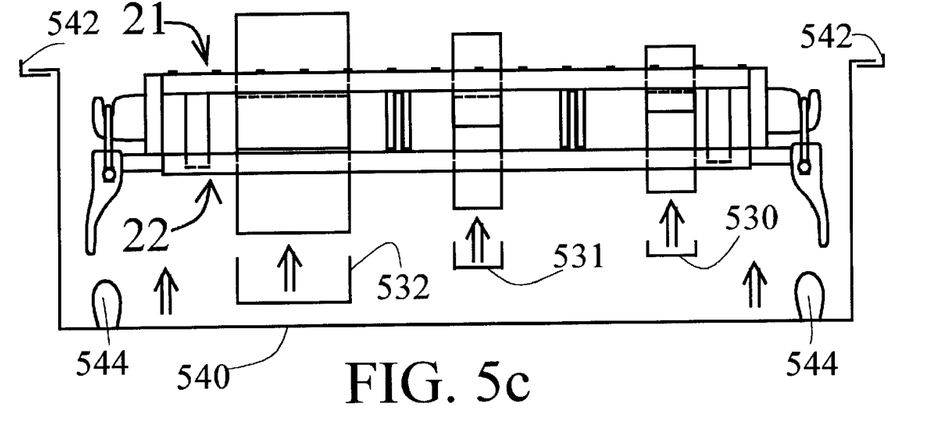

FIGS. 5*a*–5*c* illustrate various weather tight covers used to protect fixed-half quick connect panel 21 and removable-half quick connect panel 22 in various situations. In particular, it is to be observed that when these two panels are disconnected from one another, for example, when habitable vehicle 1 leaves the docking station for a few hours to go to a beach, restaurant, etc., that the connector halves on each panel will be exposed to weather and other damage unless they are suitably protected. When removable-half quick connect panel 22 is detached from fixed-half quick connect panel 21 but still attached to the various external utilities, a rainstorm, for example, can result in water actually entering the open connectors, causing shorting in the electrical conduit, and causing potential damage such as corrosion to the other connectors as well. Similarly, the exposed connectors of fixed-half quick connect panel 21 also need to be protected from the elements.

Thus, FIG. 5*a* illustrates a fixed-half weather cover 51 which mates and latches (secures) together with fixed-half quick connect panel 21 very similarly to how removable-half quick connect panel 22 mates with fixed-half quick connect panel 21 as earlier described in connection with FIG. 4*a*. Note the presence of cover latch clamps 516 on fixed-half weather cover 51 which are substantially similar to latch clamps 372 earlier discussed. However, fixed-half weather cover 51 comprises a number of "dummy" second half connectors which are designed merely to close and protect the exposed connector first halves on fixed-half quick connect panel 21 when they are not mated with their second halves. These dummy connectors include one or more dummy second half signal connectors 510 which comprise dummy connectors mating with one or more of the first half electrical, cable television, telephone, and computer data connectors. These also comprise a dummy second half potable water connector 511, and a dummy second half sewage connector 512, each mating with its first half counterpart 302 and 312. Male guide rods 330 are aligned to weather cover female guide rod receptacles 513, and elongated female slots 332 are aligned to weather cover elongated male ridges 514, just as was earlier described in connection with FIG. 4*a*. Also illustrated are one or more cover gripping handles 515 similar to and used for the same purpose as earlier described panel gripping handles 374.

FIG. 5*b* illustrates a removable-half weather cover 52 which mates and latches together with removable-half quick connect panel 22 very similarly to how fixed-half quick connect panel 21 mates with removable-half quick connect panel 22 as earlier described in connection with FIG. 4*a*. Note the presence of cover latch plates 526 on removable-half weather cover 52 which are substantially similar to latch plates 322 earlier discussed. However, although similar to fixed-half quick connect panel 21, removable-half weather cover 52 comprises a number of "dummy" first half connectors which are designed merely to close and protect the exposed connector second halves on removable-half quick connect panel 22 when they are not mated with their first halves. These dummy connectors include one or more dummy first half signal connectors 520 which comprise dummy connectors mating with one or more of the second half electrical, cable television, telephone, and computer data connectors. These also comprise a dummy first half potable water connector 521, and a dummy first half sewage connector 522, each mating with its second half counterpart 352 and 362. Weather cover male guide rods 523 are aligned to female guide rod receptacles 380, and weather cover elongated female slots 524 are aligned to elongated male ridges 382, also, just as was earlier described in connection with FIG. 4a.

FIG. 5c illustrates, for example not limitation, two alternatives for covering both fixed-half quick connect panel 21 and removable-half quick connect panel 22, when these are both attached to habitable vehicle 1 but are not connected to any external utility conduits. This would be the usual state of affairs for habitable vehicle 1 when it is not being used for habitation, but, for example, is parked in a driveway or docked at a marina during a period of nonuse. In this situation, fixed-half quick connect panel 21 and removable-half quick connect panel 22 are mated together as in FIG. 4b (but without the external utility connections to the docking station), and the object is to cover both of these, or at least to cover the exposed ends of the connectors on the non-mating surface of removable-half quick connect panel 22.

A first option uses one or more dummy connector caps which mate with the external connector interfaces on the outer, non-mating surface of removable-half quick connect panel 22. These connector caps use connector interfaces similar to those that are used to connect the various external utility conduits to these external connector (docking station) interfaces. Thus, one or more dummy signal connector caps 530 mate with and cover the external interface of the electrical, cable television, telephone, and computer data connectors. A dummy potable water connector cap 531 mates with and covers the external interface of the potable water connector. Finally, a dummy sewage connector cap 532 mates with and covers the external interface of the sewage connector. Unnumbered double arrows illustrate the movement of these various caps toward and over the external connector interfaces.

A second option uses a single weather tight cover 540 placed over the entire outer, non-mating surface of removable-half quick connect panel 22, which is then latched in place using any type of suitable latch (schematically illustrated by 542) known or which may become known in the art. This creates an improved appearance over the first option, since one cannot see each of the individual external connector interfaces when looking at the vehicle, but rather sees only weather tight cover 540.

Unnumbered double arrows also illustrate the movement of weather tight cover 540 over fixed-half quick connect panel 21 and removable-half quick connect panel 22.

If fixed-half quick connect panel 21 is permanently pre-attached to be sufficiently recessed beneath habitable vehicle 1, or is inside a compartment rather than flush with the outer surface of habitable vehicle 1, then the covering of fixed-half quick connect panel 21 and removable-half quick connect panel 22 together, as well as the covering of fixed-half quick connect panel 21 alone as in FIG. 5a, becomes somewhat simplified. In this situation, weather tight cover 540 can comprise a flat panel pivoting door mounted flush with the outer surface of habitable vehicle 1, or a compartment door, which covers any and all panels recessed beneath this outer surface. Suitable door closure and/or locks can be added as desired. In this situation, fixed-half weather cover 51 is rendered unnecessary, because weather tight cover 540 can be used whether or not removable-half quick connect panel 22 is mated with fixed-half quick connect panel 21. The only additional protection that is needed is supplied by removable-half weather cover 52 in order to protect removable-half quick connect panel 22 when it is left behind, and connected to the docking station while habitable vehicle 1 is driven elsewhere. A suitable latch, strap, or similar weather cover retainer 544 can be added to the inside (unexposed) surface of weather tight cover 540 to retain removable-half weather cover 52 when it is not being used. If weather cover retainer 544 comprises a pair of sturdy elastic straps, for example, these can simply be looped over, and will naturally tighten around, cover latch plates 526 so as to conveniently store removable-half weather cover 52 when removable-half weather cover 52 is not in use.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A method for simplifying the attachment and detachment of a habitable vehicle to and from docking station utility services of a docking station, using a docking apparatus comprising a fixed-half quick connect panel comprising a plurality of first half utility connectors and a removable-half quick connect panel comprising a plurality of second half utility connectors, comprising the steps of:

pre-attaching said fixed-half quick connect panel to said habitable vehicle;

pre-connecting said fixed-half quick connect panel to locations within said habitable vehicle where said utility services are to be used;

setting up said habitable vehicle for using said docking station utility services by connecting external utility conduits delivering said docking station utility services to said removable-half quick connect panel;

connecting said habitable vehicle to said docking station utility services while said external utility conduits remain connected to said removable-half quick connect panel, as often as desired, by mating and securing said removable-half quick connect panel to said fixed-half quick connect panel and thereby mating and securing together said first half and said second half utility connectors;

disconnecting said habitable vehicle from said docking station utility services while leaving said external utility conduits connected to said removable-half quick connect panel, as often as desired, by un-securing and un-mating said removable-half quick connect panel from said fixed-half quick connect panel; and tearing down said habitable vehicle from using said docking station utility services by disconnecting said external utility conduits from said removable-half quick connect panel.

2. The method of claim 1, said steps of pre-attaching and pre-connecting said fixed-half quick connect panel to said habitable vehicle comprising the steps of:

pre-attaching and pre-connecting said fixed-half quick connect panel to said habitable vehicle during the manufacturing of, and in combination with, said habitable vehicle.

3. The method of claim 1, said steps of pre-attaching and pre-connecting said fixed-half quick connect panel to said habitable vehicle comprising the steps of:

pre-attaching and pre-connecting said fixed-half quick connect panel to said habitable vehicle by retrofitting said habitable vehicle with said fixed-half quick connect panel subsequent to the manufacturing of said habitable vehicle.

4. The method of claim 1, said docking station utility services comprising at least two utility services, wherein:

said steps of mating and securing said removable-half quick connect panel to said fixed-half quick connect panel causes the first half connector for each of said at least two utility services to mate and secure with the second half connector for a corresponding one of each of said at least two utility services, thereby establishing a utility connection to said habitable vehicle from each of said at least two utility services; and un-securing and un-mating said removable-half quick connect panel from said fixed-half quick connect panel causes said first half connector for each of said at least two utility services to un-secure and un-mate with said second half connector for the corresponding one of each of said at least two utility services, thereby disestablishing said utility connection to said habitable vehicle from each of said at least two utility services.

5. The method of claim 4, said at least two utility services selected from among utility services comprising: potable water; electrical power; television; telephone; computer data; sewage disposal; and cleaning vacuum services.

6. The method of claim 4, said at least two utility services comprising a sewage disposal service and at least one other utility service in addition to said sewage disposal service, wherein:

said steps of mating and securing said removable-half quick connect panel to said fixed-half quick connect panel causes a substantially fluid-impenetrable barrier to be established between said sewage disposal service and said at least one other utility service.

7. The method of claim 4, said at least two utility services comprising a potable water service and at least one other utility service in addition to said potable water service, wherein:

said steps of mating and securing said removable-half quick connect panel to said fixed-half quick connect panel causes a substantially fluid-impenetrable barrier to be established between said potable water service and said at least one other utility service.

8. The method of claim 4, said at least two utility services comprising a cleaning vacuum service and at least one other utility service in addition to said cleaning vacuum service, wherein:

said steps of mating and securing said removable-half quick connect panel to said fixed-half quick connect panel causes a substantially debris-impenetrable barrier to be established between said cleaning vacuum service and said at least one other utility service.

9. The method of claim 1, further comprising the steps of:

mating and securing a fixed-half weather cover to said fixed-half quick connect panel to protect said plurality of first half utility connectors while said removable-half quick connect panel is un-secured and un-mated from said fixed-half quick connect panel.

10. The method of claim 9, said fixed-half weather cover comprising at least one dummy second half connector mating with and thereby protecting a corresponding at least one of said first half utility connectors.

11. The method of claim 1, further comprising the steps of:

mating and securing a removable-half weather cover to said removable-half quick connect panel to protect said plurality of second half utility connectors while said removable-half quick connect panel is un-secured and un-mated from said-fixed-half quick connect panel.

12. The method of claim 11, said removable-half weather cover comprising at least one dummy first half connector mating with and thereby protecting a corresponding at least one of said second half utility connectors.

13. The method of claim 1, comprising the further steps of:

mating and securing at least one connector cap to a corresponding one of said second half utility connectors of said removable-half quick connect panel, while said external utility conduits are disconnected from said removable-half quick connect panel.

14. The method of claim 1, comprising the further steps of:

securing a weather tight cover over said removable-half quick connect panel, while said external utility conduits are disconnected from said removable-half quick connect panel and said removable-half quick connect panel is mated and secured to said fixed-half quick connect panel.

15. The method of claim 14, comprising the further steps of:

storing a removable-half weather cover inside said weather tight cover.

16. The method of claim 1, said steps of mating said removable-half quick connect panel to said fixed-half quick connect panel comprising the further step of:

aligning said removable-half quick connect panel with said fixed-half quick connect panel using at least one alignment guide.

17. The method of claim 1, said steps of mating said removable-half quick connect panel to said fixed-half quick connect panel comprising the further step of:

holding said removable-half quick connect panel using at least hand grip thereof.

18. A method for simplifying the attachment and detachment of a habitable vehicle to and from at least two docking station utility services of a docking station, using a docking apparatus comprising a fixed-half quick connect panel comprising a plurality of first half utility connectors and a removable-half quick connect panel comprising a plurality of second half utility connectors, comprising the steps of:

pre-attaching said fixed-half quick connect panel to said habitable vehicle;

pre-connecting said fixed-half quick connect panel to locations within said habitable vehicle where said utility services are to be used;

setting up said habitable vehicle for using said docking station utility services by connecting external utility conduits delivering said docking station utility services to said removable-half quick connect panel;

connecting said habitable vehicle to said docking station utility services while said external utility conduits remain connected to said removable-half quick connect panel, as often as desired, by mating and securing said removable-half quick connect panel to said fixed-half quick connect panel and thereby mating and securing together said first half and said second half utility connectors;

disconnecting said habitable vehicle from said docking station utility services while leaving said external utility conduits connected to said removable-half quick connect panel, as often as desired, by un-securing and un-mating said removable-half quick connect panel from said fixed-half quick connect panel;

tearing down said habitable vehicle from using said docking station utility services by disconnecting said external utility conduits from said removable-half quick connect panel; and establishing a substantially impenetrable barrier between a first one of said utility services and at least one other of said utility services when mating and securing said removable half quick connect panel to said fixed-half quick connect panel.

19. The method of claim 18, said first one of said utility services comprising a sewage disposal service and said at least one other utility service comprising at least one other utility service in addition to said sewage disposal service:

said step of establishing said substantially impenetrable barrier comprising establishing a substantially fluid impenetrable barrier between said sewage disposal service and said at least one other utility service.

20. The method of claim 18, said first one of said utility services comprising a potable water service and said at least one other utility service comprising at least one other utility service in addition to said potable water service:

said step of establishing said substantially impenetrable barrier comprising establishing a substantially fluid impenetrable barrier between said potable water service and said at least one other utility service.

21. The method of claim 18, said first one of said utility services comprising a cleaning vacuum service and said at least one other utility service comprising at least one other utility services in addition to said cleaning vacuum service:

said step of establishing said substantially impenetrable barrier comprising establishing a substantially debris-impenetrable barrier between said cleaning vacuum service and said at least one other utility service.

22. The method of claim 18, said steps of pre-attaching and pre-connecting said fixed-half quick connect panel to said habitable vehicle comprising the steps of:

pre-attaching and pre-connecting said fixed-half quick connect panel to said habitable vehicle during the manufacturing of, and in combination with, said habitable vehicle.

23. The method of claim 18, said steps of pre-attaching and pre-connecting said fixed-half quick connect panel to said habitable vehicle comprising the steps of:

pre-attaching and pre-connecting said fixed-half quick connect panel to said habitable vehicle by retrofitting said habitable vehicle with said fixed-half quick connect panel subsequent to the manufacturing of said habitable vehicle.

24. The method of claim 18, said at least two utility services selected from among utility services comprising: potable water; electrical power; television; telephone; computer data; sewage disposal; and cleaning vacuum services.

25. A method for simplifying the attachment and detachment of a habitable vehicle to and from docking station utility services of a docking station, using a docking apparatus comprising a fixed-half quick connect panel comprising a plurality of first half utility connectors and a removable-half quick connect panel comprising a plurality of second half utility connectors, comprising the steps of:

pre-attaching said fixed-half quick connect panel to said habitable vehicle;

pre-connecting said fixed-half quick connect panel to locations within said habitable vehicle where said utility services are to be used;

setting up said habitable vehicle for using said docking station utility services by connecting external utility conduits delivering said docking station utility services to said removable-half quick connect panel;

connecting said habitable vehicle to said docking station utility services while said external utility conduits remain connected to said removable-half quick connect panel, as often as desired, by mating and securing said removable-half quick connect panel to said fixed-half quick connect panel and thereby mating and securing together said first half and said second half utility connectors;

disconnecting said habitable vehicle from said docking station utility services while leaving said external utility conduits connected to said removable-half quick connect panel, as often as desired, by un-securing and un-mating said removable-half quick connect panel from said fixed-half quick connect panel;

tearing down said habitable vehicle from using said docking station utility services by disconnecting said external utility conduits from said removable-half quick connect panel; and mating and securing a fixed-half weather cover to said fixed-half quick connect panel to protect said plurality of first half utility connectors while said removable-half quick connect panel is un-secured and un-mated from said fixed-half quick connect panel.

26. The method of claim 25, said fixed-half weather cover comprising at least one dummy second half connector mating with and thereby protecting a corresponding at least one of said first half utility connectors.

27. A method for simplifying the attachment and detachment of a habitable vehicle to and from docking station utility services of a docking station, using a docking apparatus comprising a fixed-half quick connect panel comprising a plurality of first half utility connectors and a removable-half quick connect panel comprising a plurality of second half utility connectors, comprising the steps of:

pre-attaching said fixed-half quick connect panel to said habitable vehicle;

pre-connecting said fixed-half quick connect panel to locations within said habitable vehicle where said utility services are to be used;

setting up said habitable vehicle for using said docking station utility services by connecting external utility conduits delivering said docking station utility services to said removable-half quick connect panel;

connecting said habitable vehicle to said docking station utility services while said external utility conduits remain connected to said removable-half quick connect panel, as often as desired, by mating and securing said removable-half quick connect panel to said fixed-half quick connect panel and thereby mating and securing together said first half and said second half utility connectors;

disconnecting said habitable vehicle from said docking station utility services while leaving said external utility conduits connected to said removable-half quick connect panel, as often as desired, by un-securing and un-mating said removable-half quick connect panel from said fixed-half quick connect panel;

tearing down said habitable vehicle from using said docking station utility services by disconnecting said external utility conduits from said removable-half quick connect panel; and mating and securing a removable-half weather cover to said removable-half quick connect panel to protect said plurality of second half utility connectors while said removable-half quick connect panel is un-secured and un-mated from said fixed-half quick connect panel.

28. The method of claim 27, said removable-half weather cover comprising at least one dummy first half connector mating with and thereby protecting a corresponding at least one of said second half utility connectors.

* * * * *